(No Model.)
J. GRAY.
BLOWN GLASS MUCILAGE BOTTLE.
No. 269,196. Patented Dec. 19, 1882.
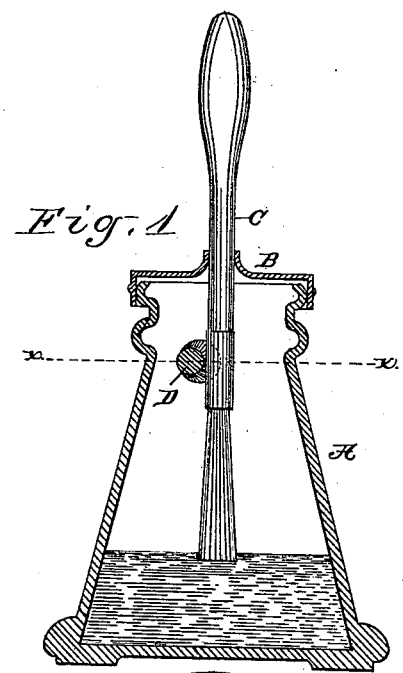
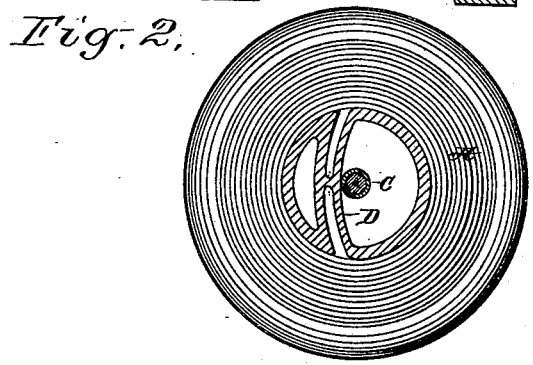
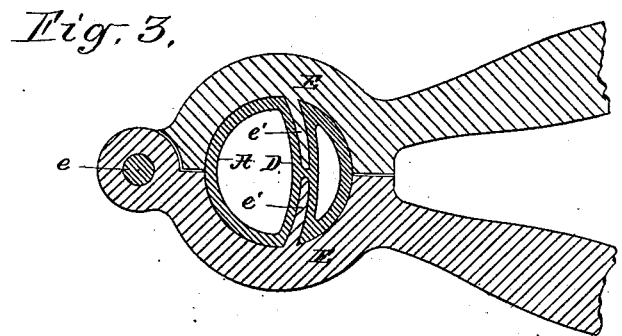
WITNESSES
F. W. Adams
Cyrus Kehr
INVENTOR
John Gray
per M. E. Dayton
Attorney

UNITED STATES PATENT OFFICE.

JOHN GRAY, OF CHICAGO, ILLINOIS, ASSIGNOR OF ONE-HALF TO NATHAN B. HUBBARD, OF SAME PLACE.

BLOWN-GLASS MUCILAGE-BOTTLE.

SPECIFICATION forming part of Letters Patent No. 269,196, dated December 19, 1882.

Application filed September 13, 1882. (No model.)

*To all whom it may concern:*

Be it known that I, JOHN GRAY, of the city of Chicago, in the county of Cook and State of Illinois, have invented certain new and useful Improvements in Blown-Glass Mucilage-Bottles; and I do hereby declare that the following is a full, clear, and exact description thereof, reference being had to the accompanying drawings, and to the letters of reference marked thereon, which form a part of this specification.

This invention relates to improvements in blown-glass mucilage-bottles; and it consists in a cross-bar or partial diaphragm located in the neck of the bottle for the purpose of partially discharging the brush of mucilage, and formed in the bottle itself when the latter is blown.

In the drawings, Figure 1 is a central vertical section of a mucilage-bottle transverse to the cross-bar referred to. Fig. 2 is a horizontal section through said cross-bar or partial diaphragm; and Fig. 3 is a section similar to that shown in Fig. 2, and also a section of the mold containing the bottle, and illustrating the manner in which said cross-bar or diaphragm is made in the act of blowing the bottle.

A represents the body of a mucilage-bottle, of ordinary form, suitable for use upon the desk.

B is the metallic cover or lid, and C is the brush, secured in the lid in the usual manner.

D is a transverse bar or partial diaphragm, of glass, integral with the body of the bottle and formed in the neck thereof in the act of blowing the bottle. The method of blowing glass bottles is assumed to be well understood.

E is a mold centrally divided, in the usual manner, and having its parts hinged together at *e*. On the interior of said mold are formed or secured metal projections or pins *e'*, one on each opposite face of the mold and larger at their bases than at their points, in order that they may draw readily from the finished bottle. Said projections are of such length preferably as to not touch when the mold is closed, but only to proximate each other, as shown in Fig. 3. Said projections or pins are also preferably curved somewhat in form and arranged in the arc of a circle whose center is at *e*, to also facilitate their drawing when the mold is opened. The glass, in proper condition to be blown, is placed in the open mold and the latter is closed upon it, in which act the pins *e'* force the glass inward, so as to meet between the pins, and subsequent blowing gives the usual effect of even distribution of the glass, so as to form a continuous bar of glass, D, integral with the body of the bottle. As shown in Figs. 2 and 3, said bar is arranged at one side of the vertical axis of the bottle, so as to give room for the brush fixed in the center of the cap or lid B.

If desired, the smaller space at one side of the bar may be entirely closed with glass, so as to make a partial diaphragm thereof instead of a mere cross-bar, as illustrated in the drawings. Such a partial diaphragm may be made by a corresponding projection located wholly on one side of the mold, as will be obvious to those skilled in the art.

I make no claim to the method of blowing the bottle with such bar or partial diaphragm; but desire it to be understood, for the purposes of my invention, a partial diaphragm is the full equivalent of the cross-bar shown.

I claim as my invention—

A blown-glass mucilage-bottle having the transverse part D integral with the body of the bottle and formed in the act of blowing the latter, substantially as described.

In testimony that I claim the foregoing as my invention, I affix my signature in presence of two witnesses.

JOHN GRAY.

Witnesses:
S. ARTHUR WALTHER,
CYRUS KEHR.